Dec. 7, 1965      J. R. MILES      3,222,516
LENTICULATED LENS FOR TRAFFIC LIGHT
Filed June 24, 1963      5 Sheets-Sheet 1
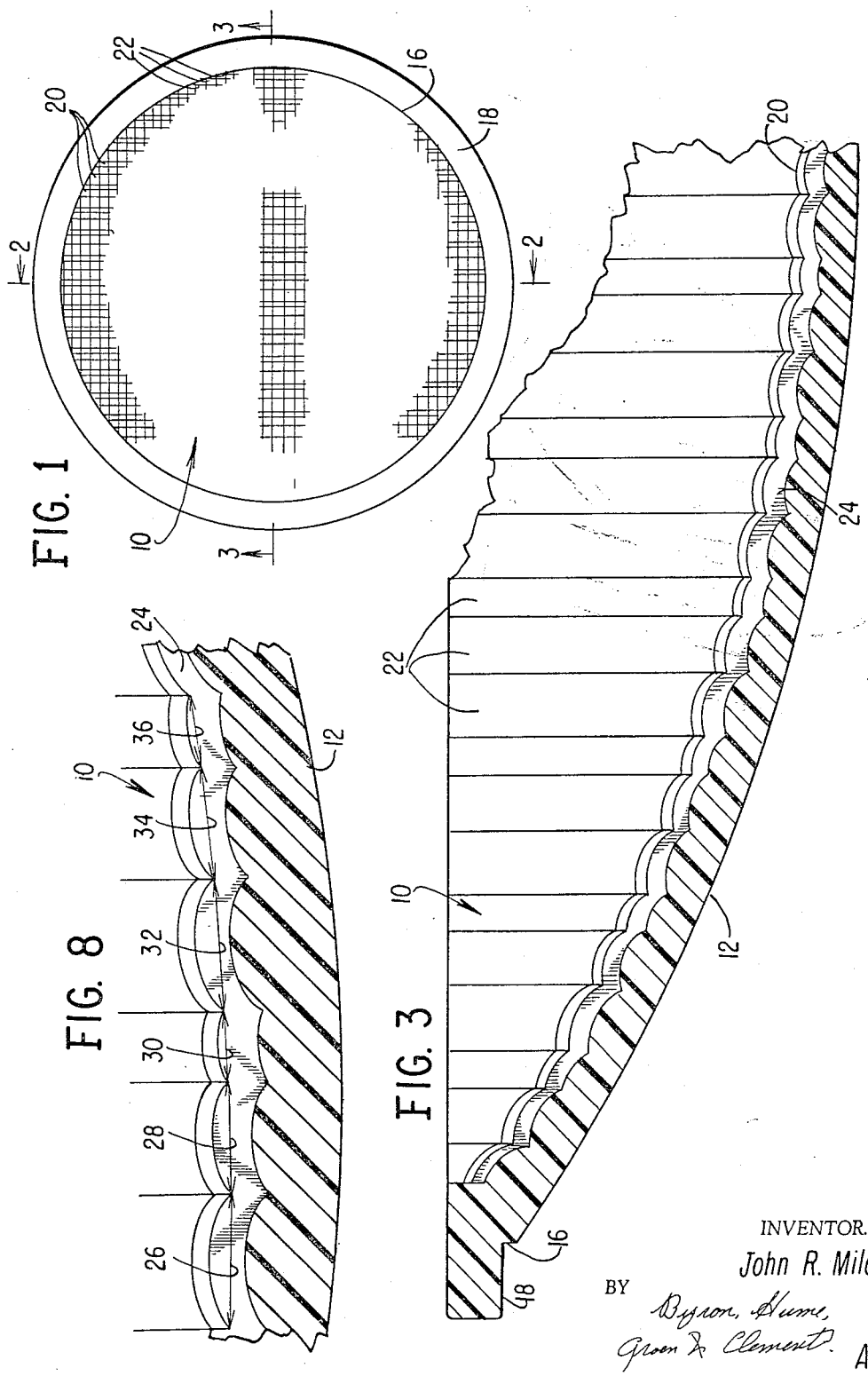
INVENTOR.
John R. Miles
BY Byron, Hume,
Groen & Clement
Attys.

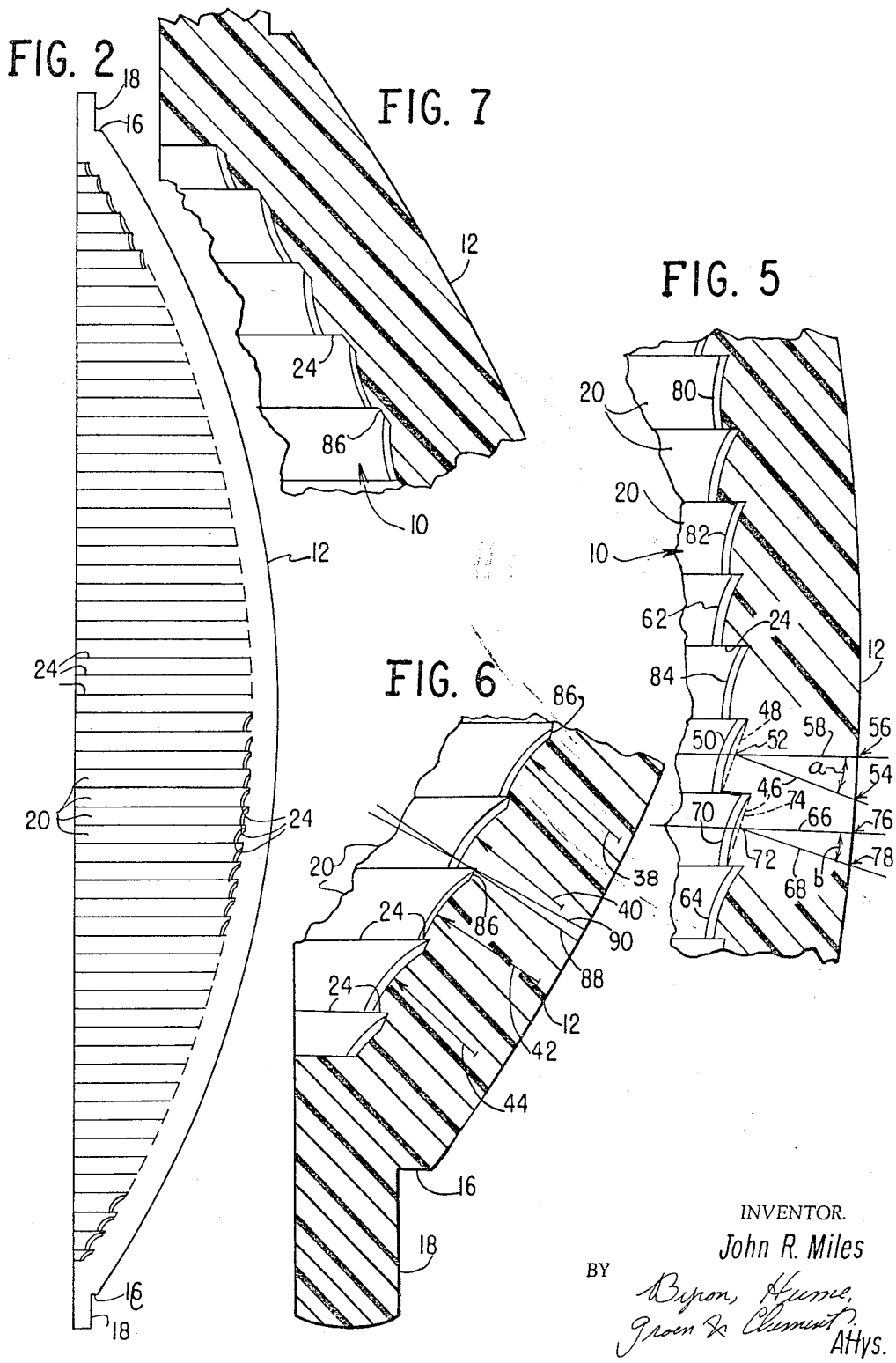

INVENTOR.
John R. Miles
BY
Byron, Hume,
Groen & Clement
Attys.

INVENTOR.
John R. Miles

Dec. 7, 1965   J. R. MILES   3,222,516
LENTICULATED LENS FOR TRAFFIC LIGHT
Filed June 24, 1963   5 Sheets-Sheet 5

INVENTOR.
John R Miles
BY Byron, Hume,
Groen & Clement
Attys.

United States Patent Office 3,222,516
Patented Dec. 7, 1965

3,222,516
LENTICULATED LENS FOR TRAFFIC LIGHT
John R. Miles, Glenview, Ill., assignor to Lancaster Glass Corporation, Lancaster, Ohio, a corporation of Ohio
Filed June 24, 1963, Ser. No. 289,914
6 Claims. (Cl. 240—106.1)

This invention relates to a lens for a signal light and more particularly, to such a lens manufactured by molding or casting suitable lens material in a die the cavities of which are finished to directly produce a finished cast optical surface on the molded lens. Still more particularly the invention relates to a molded lens of suitable thermoplastic material particularly adapted for use as a traffic light lens and in similar applications.

A signal light, such as a traffic light, should necessarily have as high a degree of visibility as possible. One means of insuring this result is to provide a lens for such a device which has a field pattern that conforms substantially to the specific area from which the light will normally be viewed. Obviously, in a traffic signal, the lens should have optical characteristics such that as much of the projected light as possible is directed in a downward direction toward the surface of the roadway which carries the approaching traffic. Likewise, there should be as uniform a light intensity as possible in the area in which the light should be visible. These requirements, as a practical matter demand that the horizontal spread of the light emanating from the lens be restricted as closely as is practical to the width of the roadway. Likewise, the vertical spread must be severely restricted so that as high a percentage as possible of the light emanating from the source is ultimately directed downwardly below the horizontal axis of the lens.

It is therefore an object of this invention to provide a cast lens structure embodying novel improved light refracting and diffusing surfaces. A further object is to provide such a lens structure which gives an improved pattern of overlapping beams productive of a field of improved uniformity of light intensity over the desired field of light projection.

Further objects and advantages of this invention will become evident as the description proceeds and from an examination of the accompanying drawings which illustrate the invention and in which similar numerals refer to similar parts throughout the several views.

In the drawings:

FIGURE 1 is a front view of a lens incorporating one form of the present invention with the detailed configuration of the inner face being shown somewhat diagrammatically.

FIGURE 2 is a view in vertical section taken along the line 2—2 shown in FIGURE 1, showing in particular the cross-sectional configuration of one of the vertical rows of convex rectilinear segments on the inner face of the lens. The remaining portion of the inner face is shown somewhat diagrammatically.

FIGURE 3 is a view in horizontal section taken along the line 3—3 of FIGURE 1, disclosing in particular the cross-sectional configuration of one of the transverse, scalloped flutes on the inner surface of the lens. The remaining portion of the inner face is again shown somewhat diagrammatically.

FIGURE 5 is an enlarged, fragmentary view in vertical section of a portion of the lens shown in FIGURE 2, with the unsectioned portion of the inner face again being shown somewhat diagrammatically.

FIGURE 6 is another enlarged, fragmentary view in vertical section, similar to FIGURE 5, of a portion of the lens shown in FIGURE 2.

FIGURE 7 is another enlarged fragmentary view in vertical section, similar to FIGURE 5, of another portion of the lens shown in FIGURE 2.

FIGURE 8 is an enlarged fragmentary view in horizontal section of a portion of the lens shown in FIGURE 3, with the unsectioned portion of the inner face again being shown somewhat diagrammatically.

Figure 4:
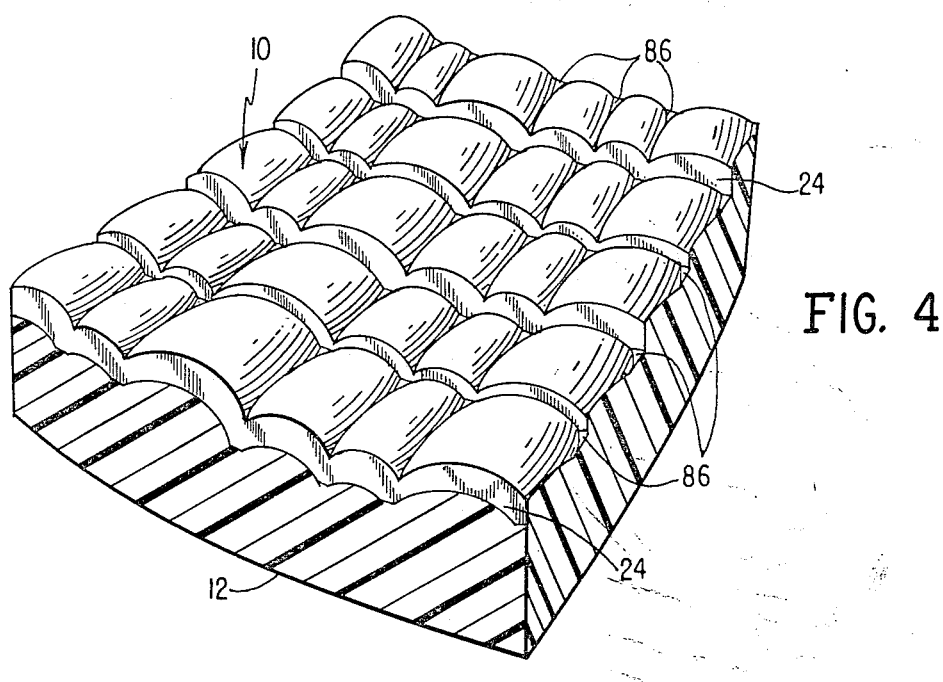
FIGURE 4 is a fragmentary perspective view of an enlarged portion of the inner face of the lens showing the specific configuration of the transverse, scalloped flutes and the convex, rectilinear bi-radial segments formed therein.

In FIGURES 1, 2 and 3 a lens incorporating a preferred embodiment of the invention is shown in the form of a single element spherical section of light transmitting material having an inner face, indicated generally by the numeral 10, and an outer face, indicated generally by the numeral 12. It should be noted that for purposes of reference in the following description the lens will be assumed to be disposed so that its chordal plane is vertically oriented and with the same point on the periphery of the section constantly disposed uppermost.

The outer periphery 16 of the section is preferably provided with an annular flange 18 in the conventional manner. The outer face 12 of the lens is entirely smooth in accordance with the desired practice dictated in part by maintenance considerations. The inner face, on the other hand, is provided with a plurality of transversely extending flutes, indicated generally by the numeral 20. These flutes are scalloped along their longitudinal axis as shown in FIGURE 4, although this characteristic is not represented in the diagrammatic showing of the inner face which is incorporated in FIGURES 2, 5, 6 and 7.

As best shown in FIGURES 2 and 5, the flutes 20 have a vertical radius which in the preferred form of lens is equal in alternate flutes. As shown in FIGURE 6, for example, the radius 38 is larger than the radius 40, while the radius 42 is equal to the radius 38 and the radius 44 is equal to the radius 40. As best shown in FIGURES 3 and 4, each flute is also scalloped along its horizontal axis. In the preferred form the horizontal radii of the scalloped portions are equal, although the horizontal chord length of such portions vary. This preferred form incorporates a repetitive pattern of cord lengths in groups of three, as best shown in FIGURE 8, where the chords 26, 28 and 30 are shown to be of diminishing length, respectively, with the chords 32, 34 and 36 repeating the same pattern.

As best shown in FIGURES 1 and 4, each flute 20 is disposed in such a way that scalloped portions of a particular chord length are preferably disposed to form vertical rows on the inner face. With this arrangement of the flutes 20, the inner face 10 therefore is made up of contiguous vertical rows of bi-radial, substantially rectilinear segments, best shown in FIGURE 4 and identified generally by the numeral 22.

As shown in detail in FIGURES 5, 6 and 7, these rectilinear segments are canted at varying degrees with respect to the horizontally disposed bases 24 of the flutes. This variation in canting with respect to a horizontal plane is evident in comparing FIGURES 6 and 7. However, with respect of the outer face 12 of the lens, the segments are canted in an alternately repetitive pattern. As shown in FIGURE 5, a line 46 normal to the chordal plane 48 (shown as a dotted line) of segment 50 and passing through the center point 52 of such chordal plane intersects the outer face 12 of the lens at a point 54. This point is disposed below the point of intersection 56 of a radius 58 of said face 12 which also extends through the center point 52 of the chordal plane 48. The angle $a$ subtended by the lines 46 and 58 is equal for alternate segments such as the segments 60, 62, 50 and 64.

The difference in canting in adjacent flutes is illustrated by a comparison of the angle $a$ with the angle $b$ subtended by the lines 66 and 68 corresponding to the lines 58 and 46, respectively, but drawn in connection with the segment 70 through the center point 72 of the chordal plane 74. The line 66 intersects the outer face 12 at the point 76 and the line 68 intersects the face 12 at the point 78. Alternate segments 80, 82 and 84 are all disposed so that the angle subtended by lines equivalent to lines 66 and 68 drawn with respect to these additional segments would also subtend an angle equal to $b$.

It has been found desirable to provide a plurality of planar areas 86 in addition to the bi-radial segments just described, as best shown in FIGURE 4. These areas are preferably disposed between the adjacent upper corners of adjacent segments and have substantially the same optical effects as prisms. They are indicated as present in FIGURES 2, 6 and 7 but are omitted from FIGURE 5 for clarity in illustrating the canting of the segments.

As shown in FIGURE 6, these planar areas 86 are disposed so that a line 88 normal thereto subtends an angle of preferably approximately 5° with a radius 90 of the face 12, which radius intersects the planar area 86 at the same point as the line 88.

A particular advantage of a lens incorporating the present invention is the fact that, although its physical configuration is somewhat complex, it readily lends itself to being molded from a die made up of a plurality of horizontally disposed plates or blades stacked vertically, the edges of which have been shaped by suitable bi-radial rotating cutters. These cutters are of a character and a configuration such that they may be used to provide each blade edge with a configuration complementary to the configuration of one of the transverse flutes to be formed on the inner face of the lens.

The planar areas 86 may be added to the lens by removing the sharp corners formed by the bi-radial rotating cutters along the upper edge thereof so that a planar surface is formed in place of the sharp corner. The end result is best illustrated in FIGURE 6 insofar as illustrating the type of molded configuration resulting from such modified blade edges.

Figure 9:
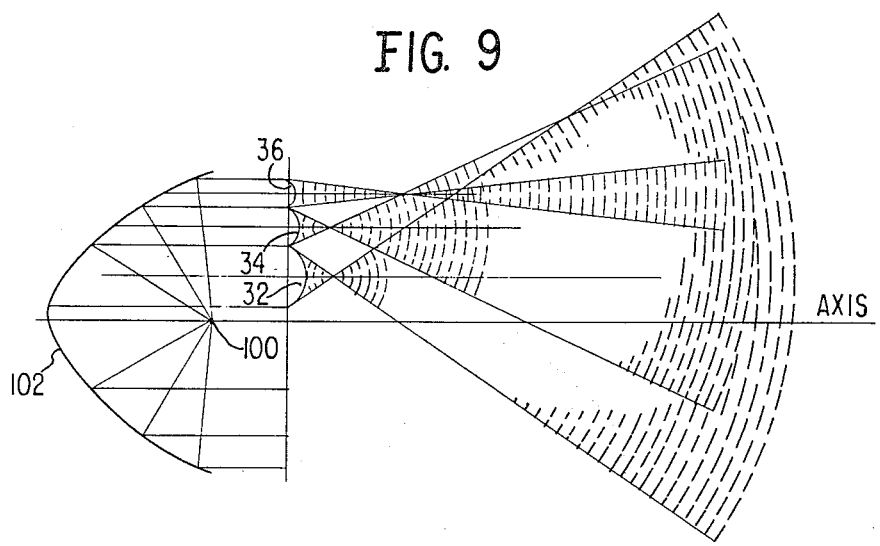
FIGURE 9 is a diagrammatic view showing how an image of the filament is projected from a point on the reflector by each of the three rectilinear segments of varying chord lengths in each flute, the view being taken from above and showing the varying angular spreads obtained from the bi-radial segments of different chord lengths but equal horizontal radii.

FIGURE 9 illustrates diagrammatically the various angular spreads as viewed from above of adjacent, horizontally aligned, bi-radial segments having decreasing chordal lengths 32, 34 and 36 shown in FIGURE 8, the line 98 being the horizontal axis of the complete lens element and assuming a point source of light 100 and the use of a parabolic reflector 102. The material used in the lenses illustrated is assumed to be glass with an index of 1.5 so that the light is refracted to an angle one-half the angle of the glass.

Figure 10:
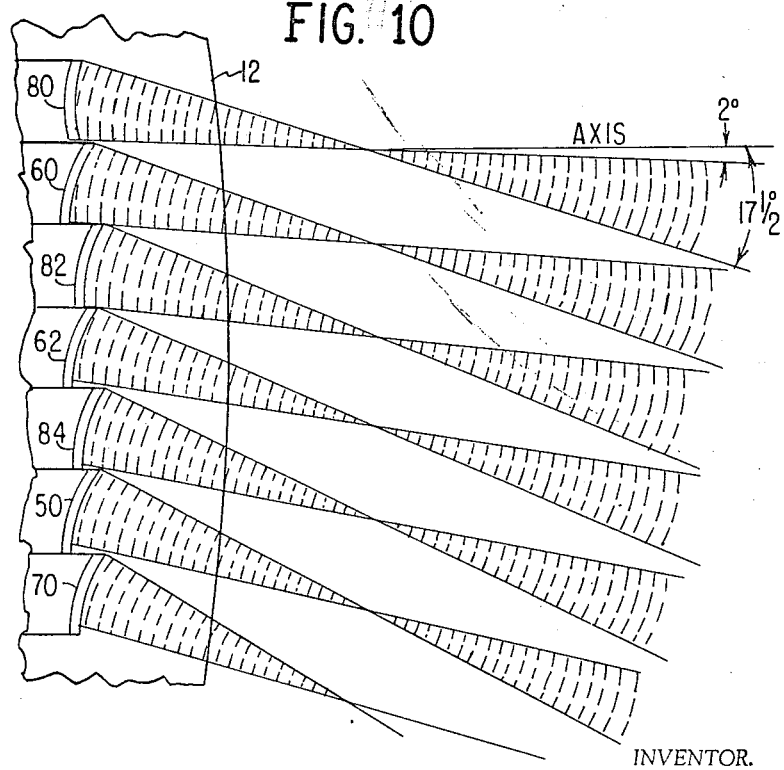
FIGURE 10 is a diagrammatic view showing the optical effect of the bi-radial segments when viewed from the side with the lowering of a bundle of rays emanating in a horizontal direction from the parabolic reflector.

FIGURE 10 diagrammatically illustrates the additional vertical spreading and downward displacement of each bundle from each bi-radial lens element. The downward displacement is brought about basically by the generally prismatic aspect of each of these bi-radial elements. As previously discussed with reference to FIGURE 5, alternate flutes are canted differently with respect to the front surface 12 of the lens so that horizontal rows of the bi-radial elements alternate in the amount of downward displacement given to such a bundle of rays as illustrated in the side view of FIGURE 10. Such a characteristic is desirable in order to even out the variations resulting from irregularities which occur in filaments, lens fabrication and other like factors.

Figure 11:
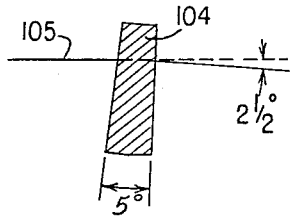
FIGURE 11 is a simple diagrammatic showing of the general prismatic effect of the segments illustrated in FIGURE 10.

The light is deflected downwardly by a simple refraction according to Snell's law, and FIGURE 11 is a diagrammatic illustration of this principle. The prism 104 having an angle of 5° produces an angular displacement (lowering) of 2½°, as there illustrated by the ray 105. The lens previously described, as illustrated in FIGURES 1 to 8, is designed so that there is an approximate downward deflection brought about by all the elements of the lens of an average of about 2½°, including both the bi-radial segments and the planar areas 86. As previously discussed, the bi-radial elements also spread the light vertically and horizontally, due to this curvature both in a horizontal and vertical plane.

Figure 12:
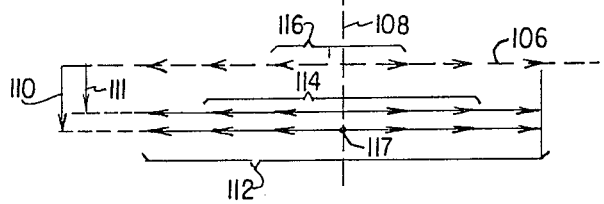
FIGURE 12 is a diagrammatic representation of the amount of horizontal spread produced by each bi-radial segment having a particular horizontal chord length and likewise the varying amount of downward displacement produced by adjacent horizontal rows of the bi-radial segments, assuming a point source of light.

FIGURE 12 shows diagrammatically the horizontal spreading and the downward displacement of all the bundles from each of the elements. The horizontal spread illustrated in FIGURE 9 for the three bi-radial segments of different lengths is illustrated in FIGURE 12 by the dotted arrows along the horizontal axis 106, with the arrows representing the limits of these spreads, on each side of the vertical axis 108. The downward displacement due to the canting of the flutes is illustrated by the solid arrows, the line or arrows displaced downwardly by the amount indicated by the arrow 110 being representative of the spread of the bundles from a segment such as element 50 shown in FIGURE 5. The line of arrows displaced by the amount represented by the arrow 111 is representative of the spread of the bundles from a segment such as segment 70, this segment having a slightly lesser angle of canting, as previously described in connection with FIGURE 5. The brackets 112, 114 and 116 are drawn to more clearly indicate the limits of the spreading for segments having chordal lengths 32, 34 and 36, respectively, as shown in FIGURE 8.

The planar surfaces 86, previously described, tend to increase the illumination at the center line of the presentation of the light pattern but lowered about 2½°, which is the point of maximum illumination required by the specifications normally required for lenses of this type for use in traffic lights. The point of increased illumination produced thereby is represented by the dot 117 in FIGURE 12.

Figure 13:
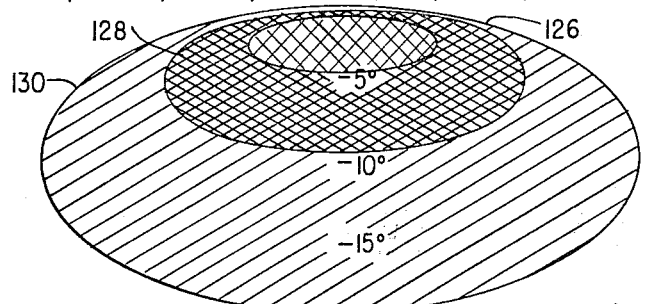
FIGURE 13 is a diagrammatic view showing the type of pattern ideally sought for this type of lens element.
Figure 14:
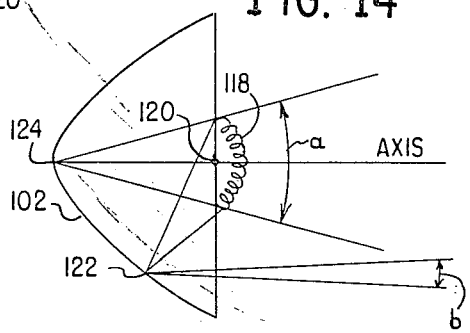
FIGURE 14 is a diagrammatic view from above of a parabolic reflector and filament with which the lens element would normally be used, illustrating the angular spread due to the size of the filament, and the variation in this spread relative to the location of the particular point of reflection on the reflector.

FIGURE 13 shows the theoretically perfect pattern which would be produced by a perfect disc filament. However, in actual practice the filament has a configuration more nearly like the filament 118 shown in FIGURE 14, which figure is a diagrammatic illustration of an actual filament and of the angular spread resulting therefrom. It illustrates how this angular spread $a$ is different for the center of the parabolic reflector in comparison with the edge of the reflector. As is shown the edge of the reflector spreads the light by a much smaller amount *b* due in part to the foreshortening of the filament 118 at that angle as "seen" by the reflector from that point. In addition, the distance from the focus 120 to the point of reflection 122 at the side of the parabolic reflector, is substantially larger than the distance from the focus 120 to the point of reflection 124, at the center of the reflector. The type of spreading indicated in FIGURE 13 actually results in a single ray being spread to form a disc or spot rather than a point of light. Each bi-radial segment of the group of three shown in FIGURE 9 would form an infinite number of circular spots the centers of which would fall basically within the three ellipses 126, 128 and 130 shown in FIGURE 13 and which are produced by bi-radial segments of the chordal lengths 36, 34 and 32, respectively.

The type of pattern required of a lens used for traffic control normally necessitates both a spreading and a concentration of the light. The requirement of a maximum concentration of light below the horizontal axis by such a lens is due to the fact that normally no observer, such as the driver of an automobile, would be at a point as high as the horizontal axis of the lens. It is assumed that everyone, including those at the most distant point from which the signal should be visible for traffic control purposes, will be at least 2½° below this horizontal axis. In addition, it is assumed that no one below 17½° from the horizontal axis need see the light, and no one more than 28° to the right or left of the horizontal center axis needs to see the light.

Figure 15:
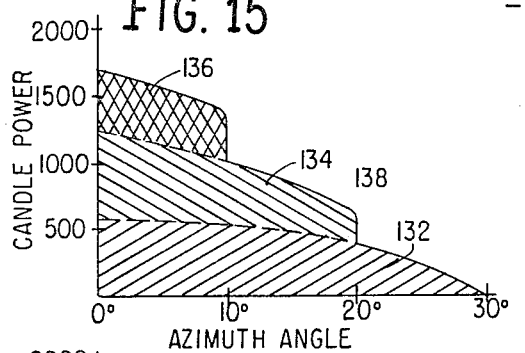
FIGURE 15 is a graphical representation of the intensity of light projected as a function of the angle from the horizontal axis of the lens.
Figure 16:
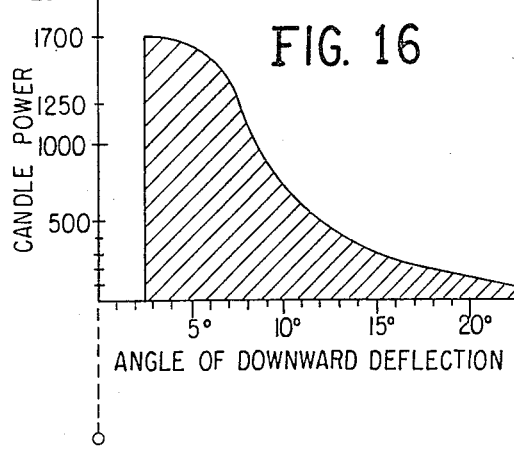
FIGURE 16 is a graphical representation of the light intensity as a function of the viewing angle measured as the angle between a line from the observer's eye to the lens and the horizontal axis of the lens.

These requirements are graphically illustrated in FIGURES 15 and 16. FIGURE 15 shows the approximate distribution or pattern of light intensity in candle power with relation to the horizontal center axis of the lens having the properties described. Portion 132 is attributable to bi-radial segments having a chordal length 32; portion 134 is attributable to segments having a chordal length 34; and portion 136 is attributable to segments having a chordal length 36. The sum of this type of distribution in a horizontal plane including the horizontal axis at any particular angle to that axis is illustrated generally by the envelope 138.

FIGURE 16 is a graphical representation of the approximate distribution or pattern of light intensity at road level below the horizontal center axis of the light at varying degrees of observation. In other words, the angle between a line joining the observer's eye and the light and the horizontal center axis of the light is set out on one axis of the graph, while the intensity of the light is measured on the other axis. It will be noted that due to the design, as described, there is no light projected at an angle of less than 2½° to the horizontal center axis.

It will be evident to those skilled in the art that through the combinations of surfaces having features of curvature and diffusion characteristics embodying the principles of the present invention, some latitude is afforded the designer in the design of a particular lens to meet particular specifications, since the nature and extent of the spread and direction of the rays can be varied between relatively wide limits by appropriate selection of radii of curvature of the surfaces. On the other hand, the field pattern obtained from a lens incorporating the preferred embodiment of the invention described above is a close approximation of an idealized pattern for such a device.

In the drawings and specification, there has been set forth a preferred embodiment of the invention, and although specific terms are employed, they are used in a generic and descriptive sense only and not for purposes of limitation. Changes in form and in the proportion of parts, as well as the substitution of equivalents are contemplated, as circumstances may suggest or render expedient, without departing from the spirit or scope of this invention as further defined in the following claims.

I claim:

1. A lens for a signal light comprising a spherical section of light transmitting material having an inner face and an outer face, said inner face, when viewed with its chordal plane vertical, being provided with a plurality of contiguous transversely disposed flutes, each said flute having a vertical radius and a base disposed in a horizontal plane, and being scalloped along its horizontal axis to form a plurality of contiguous, bi-radial, convex, rectilinear segments, each said segment being canted so that the central vertical radius thereof intersects said outer face at a point below the point of intersection of said outer face by a radius of said face extending through the center point of said segment, each said bi-radial, rectilinear segment in any one flute being equally canted with respect to said radius of said outer face that extends through the center point of said segment, but with the degree of canting of said segments and the radii of said segments being equal in alternate flutes.

2. A lens for a signal light comprising a spherical section of light transmitting material having an inner face and an outer face, said inner face, when viewed with its chordal plane vertical, being provided with a plurality of contiguous transversely disposed flutes, each said flute having a vertical radius and being scalloped along its horizontal axis, the scalloped portions in each flute having a configuration and alignment such as to form a plurality of contiguous, bi-radial, convex, rectilinear segments, and also being provided with a plurality of relatively small planar areas between the adjacent upper corners of adjacent segments, said planar areas being canted so that a line normal to the surface of each said planar area and through the center point thereof intersects said outer face at a point below the point of intersection of said outer face by the radius of said outer face that extends through said center point of said planar area.

3. A lens for a signal light of the character described in claim 2, further characterized in that each said planar area is equally canted with respect to said radius of said outer face that extends through the center point of said planar area.

4. A lens for a signal light comprising a spherical section of light transmitting material having an inner face and an outer face, said inner face, when viewed with its chordal plane vertical, being provided with a plurality of contiguous transversely disposed flutes, each said flute having a vertical radius and being scalloped along its horizontal axis to form a plurality of contiguous, bi-radial, convex, rectilinear segments, each said segment being canted so that the central vertical radius thereof intersects said outer face at a point below the point of intersection of said outer face by a radius of said face extending through the center point of said segment.

5. A lens for a signal light of the character described in claim 4, further characterized in that each said bi-radial, rectilinear segment in any one flute is equally canted with respect to said radius of said outer face that extends through the center point of said segment.

6. A lens for a signal light of the character described in claim 5, further characterized in that the degree of canting of said segments varies between flutes.

References Cited by the Examiner

UNITED STATES PATENTS

| 2,568,494 | 9/1951 | Geissbuhler | 240—41.3 |
| 2,782,297 | 2/1957 | Geissbuhler et al. | 240—41.3 |
| 3,119,894 | 1/1964 | Nagel et al. | 240—106.1 X |

FOREIGN PATENTS

| 826,919 | 1/1960 | Great Britain. |

NORTON ANSHER, *Primary Examiner.*